(12) United States Patent
Hwang

(10) Patent No.: US 7,027,547 B1
(45) Date of Patent: Apr. 11, 2006

(54) METHOD AND APPARATUS FOR MATCHING TRANSMISSION RATES ACROSS A SINGLE CHANNEL

(75) Inventor: Jin H. Hwang, Cerritos, CA (US)

(73) Assignee: Crest Microsystems, Cerritos, CA (US)

( * ) Notice: Subject to any disclaimer, the term of this patent is extended or adjusted under 35 U.S.C. 154(b) by 766 days.

(21) Appl. No.: 09/972,368

(22) Filed: Oct. 5, 2001

(51) Int. Cl.
*H04L 25/00* (2006.01)
*H04L 7/00* (2006.01)
(52) U.S. Cl. .................................. 375/372
(58) Field of Classification Search ............. 375/371, 375/372
See application file for complete search history.

(56) References Cited

U.S. PATENT DOCUMENTS 6,415,006 B1 * 7/2002 Rude ........................... 375/372
6,625,241 B1 * 9/2003 Mejia .......................... 375/372
6,757,348 B1 * 6/2004 Vila et al. .................... 375/372
6,891,845 B1 * 5/2005 Boock et al. ................ 370/412

* cited by examiner

*Primary Examiner*—Kevin Kim
(74) *Attorney, Agent, or Firm*—Blakely, Sokoloff, Taylor & Zafman, LLP

(57) ABSTRACT

The invention provides a novel scheme to match the clock rates along a single transmission channel.

The rate matching aspect of this invention receives a character stream synchronized by a first clock and buffers the character streams. Buffered characters are then transmitted over an output channel synchronized by a second clock. The rate matching system removes one or more filler or removable characters from the output channel if an overflow condition is detected and inserts one or more filler or removable characters in the output channel if an underflow condition is detected.

39 Claims, 12 Drawing Sheets

METHOD AND APPARATUS FOR MATCHING TRANSMISSION RATES ACROSS A SINGLE CHANNEL

FIELD

The invention pertains generally to integrated circuit technology and to integrated circuits used in data communications. More particularly, the invention relates to a method and apparatus for matching the transmission rates of a single channel buffer.

BACKGROUND OF THE INVENTION

Recent developments in data communications have created the need for increasing the amount and speed of data transmitted. As the volume of data communicated increases, there is an increased desired for greater transmission speeds over various media. One limitation to greater transmission speeds is the decreased reliability of data signals at high speeds. That is, high speed transmission of digital data is limited by the reliability of cost effective transmission media.

Digital communication networks are one place where higher transmission speeds are desirable. Data is often broken into smaller segments, or packetized, at a transmitting device before it is transmitted over the network. A receiving device reconstructs the packets to rebuild the data into its original form. The packets may be transmitted over one or more physical or logical channels from the transmitting device to the receiving device on the network.

A channel may represent a different transmission path between two or more devices on the network. A channel may be comprised of a single transmission medium or different transmission mediums. Channel media may include twisted pair, coaxial cable, fiber optic, and/or air.

Ideally, packet transmissions would be synchronized throughout the network. However, it is often impractical or impossible to synchronize data transmissions between multiple devices. In many cases it may not be possible to provide a single synchronizing clock to all devices on the network.

A problem with transmission schemes is the inherent rate differences between clocks. That is, even clocks with the same specified frequency have small differences or errors over many cycles. Over time, these small errors between clock rates may result in processing errors of data received over a channel. For instance, differences between the write clock and the read clock of a transmission channel at a receiving device may result in skipping or corrupting data.

Accordingly, there is a need for a method and/or apparatus that can match the frequencies of transmitting and receiving clocks across a transmission channel.

DETAILED DESCRIPTION OF THE INVENTION

In the following detailed description of the invention, numerous specific details are set forth in order to provide a thorough understanding of the invention. However, it will be obvious to one skilled in the art that the present invention may be practiced without these specific details. In other instances well known methods, procedures, components, and/or circuits have not been described in detail so as not to unnecessarily obscure aspects of the present invention.

One aspect of the invention provides a novel scheme to compensate for frequency differences between a transmit/write clock and a receive/read clock along a transmission channel.

Figure 1:
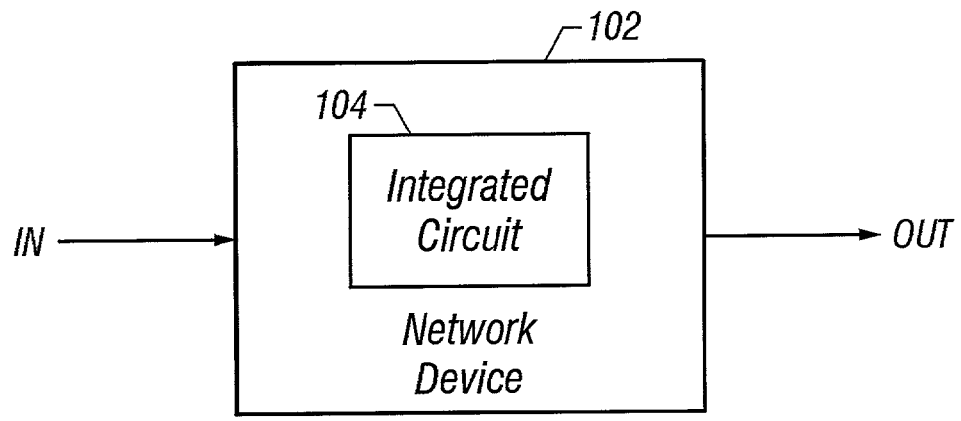
FIG. 1 is a block diagram illustrating one embodiment of a network device where the rate matching invention may be employed.

FIG. 1 is a block diagram illustrating how the invention may be practiced on a network or router device 102. The network/router device 102 may comprise an input port IN, with one or more data channels, to receive data, an integrated circuit 104 configured to receive and process the data according to the invention, and an output port OUT to transmit data using one or more data channels.

In one embodiment, the network device/router 102 may be part of a computer, server, or other electronic device. In various implementations, the invention may be embodied within a multi-component circuit, one or more integrated circuit devices, one or more computer instructions, and/or a machine-readable medium.

Figure 2:
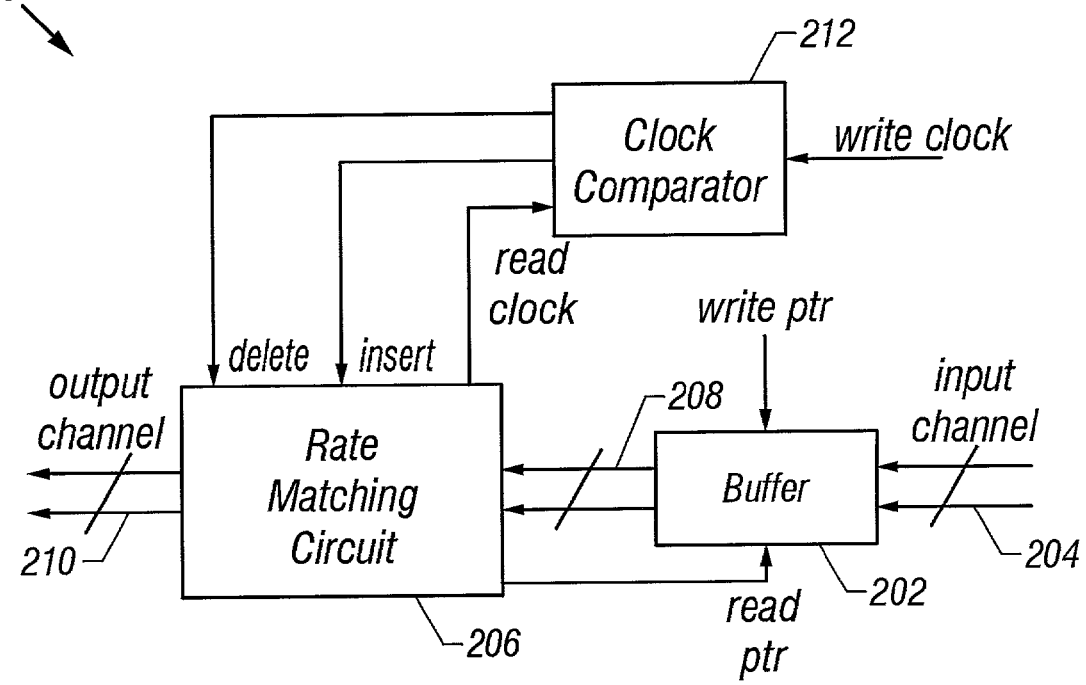
FIG. 2 is a block diagram illustrating one embodiment of a device comprising the rate matching invention.

FIG. 2 provides a block diagram illustrating one embodiment of the invention. In one implementation, the system in FIG. 2 represents a portion of the integrated circuit 104 of FIG. 1.

In one embodiment of the invention, the rate matching system comprises a buffer 202 to receive data from an input channel 204, rate matching circuit 206 coupled to the buffer 202 to take data from the buffer 202 and transmit it via an output channel 210. A clock comparator 212 serves to compare the rate at which data is written to and read from the buffer 202 and provide one or more signals to the rate matching circuit 206 to enable rate matching.

The input channel 204 and/or output channel 210 may comprise one or more transmission paths. In one embodiment, the number of transmission paths in the input channel and output channel is the same.

The buffer 202 may include various storage devices or media, including any number of temporary/volatile and/or permanent/non-volatile memory storage devices, in various configurations.

The rate matching circuit 206 may include any number of devices including a general purpose processor, an application specific processor, a programmable device, registers, and/or an application specific integrated circuit. In one embodiment the rate matching circuit 206 may include a channel controller to control the flow of data across a transmission channel.

The clock comparator 212 may include any number of circuits and/or processors to compare the rate at which data is written to the buffer 202. In one embodiment, a write clock and a read clock may be compared by the clock comparator 212. In one implementation, the write clock may be generated from the input channel. Another embodiment employs one or more counters to track the write and read operations to and from the buffer 202.

Figure 3:
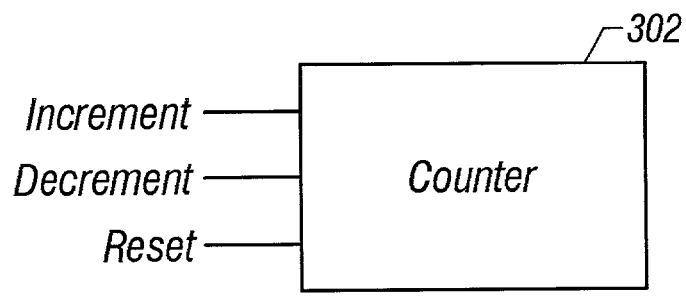
FIG. 3 is a block diagram illustrating one embodiment of a clock comparator that may be employed in the rate matching invention.

FIG. 3 illustrates one embodiment of a clock comparator 212 which is implemented as a counter 302. Every time a character, or set of characters, is written into the data buffer 202 the counter 302 is incremented by one. Conversely, for every time a character, or set of characters, is read from the data buffer 202 the counter 302 is decremented by one. In one implementation, no characters are read from the buffer 202 unless six or more characters have been written into the buffer 202.

According to one implementation, if the counter 302 decrements to a particular minimum limit, i.e. four, an underflow condition is triggered and the rate matching circuit 206 inserts one or more filler characters on the next clock cycle. Generally, the rate matching circuit 206 inserts a filler character(s) in the interval between two data packets. In one embodiment, a filler character(s) is inserted into the output channel 210 of the rate matching circuit 206. In another embodiment, the rate matching circuit 206 inserts one or more filler characters into the buffer 202 and increments the counter 302 accordingly.

According to one embodiment, if the counter 302 increments to a particular maximum limit, i.e. twelve, then an overflow condition is triggered and the rate matching circuit 206 deletes/skips one or more of the next available filler character(s). Deleting or skipping a character has the effect of removing more characters from the buffer 202 than usual on a particular clock cycle thereby reducing the rate difference between a write clock and a read clock. In one embodiment, the rate matching circuit 206 removes/skips one or more filler characters from the buffer 202 and decrements the counter 302 accordingly. In another embodiment, the rate matching circuit 206 removes one or more filler characters from the buffer 202 and decrements the counter 302 by an equal number of characters removed.

Figure 4:
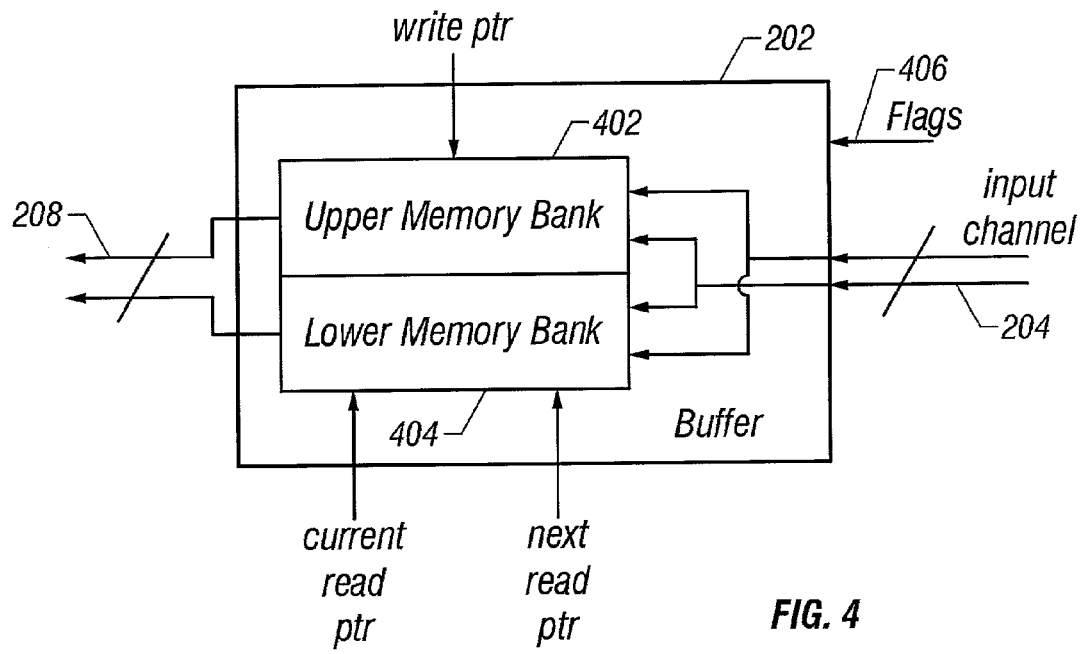
FIG. 4 is a block diagram illustrating one example of an embodiment of a buffer that may be employed in the rate matching invention.

FIG. 4 is a block diagram illustrating one example of an embodiment of a buffer 202 that may be employed in the rate matching invention. The buffer 202 may be physically or logically configured as separate memory banks. In one embodiment, an upper memory bank 402 and a lower memory bank 404 serve to receive and store data from the input channel 204. One or more write pointers may serve to indicate the storage location of incoming data. In one embodiment, half of the incoming data is written to the upper memory bank 402 and the other half of the incoming data is written to the lower memory bank 402 on every write clock cycle. One or more read pointers (e.g. current read ptr and next read ptr) may serve to indicate where data is being read from in the memory banks 402 and 404. In one embodiment, half of the outgoing data is read from the upper memory bank 402 and the other half of the outgoing data is read from the lower memory bank 404 on every read clock cycle. A memory bank may be further divided, physically or logically, into registers, queues, and/or other storage components.

One or more flag inputs may serve to indicate or provide information about certain characteristics of the input channel data. The one or more flags may be set in a number of ways.

Figure 5:
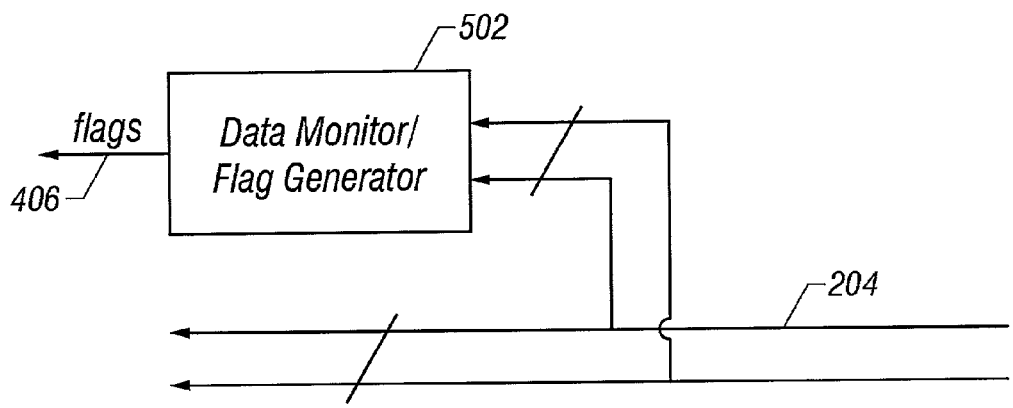
FIG. 5 is a block diagram illustrating one embodiment of a data monitor/flag generator as may be employed in one embodiment of the invention.

FIG. 5 is a block diagram illustrating one embodiment of a data monitor/flag generator 502 as may be employed in one embodiment of the invention. The data monitor 502 monitors the input channel 202 and determines the characteristics of the data across the channel 202. The flag generator 502 then provides flags 406 indicative of characteristics for each character or sets of characters in the data channel 202. These flags 306 may serve as an input to the buffer 202.

The data monitor/flag generator 502 may be any number of devices including a general purpose processor, an application specific processor, a programmable device, and an application specific integrated circuit. The data monitor/flag generator 502 may also include a device capable of detecting a particular character and/or bit pattern in a character stream.

Figure 6:
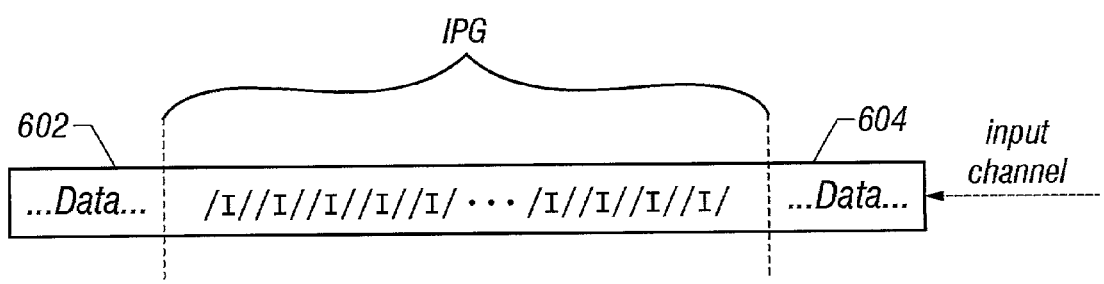
FIG. 6 illustrates an example of the format of a data stream across the input channel of one embodiment of the rate matching invention.

FIG. 6 illustrates an example of the format of a data stream across the input channel 202. Many communication systems transmit data in packets or frames 602 and 604. In one embodiment, the data packets/frames 602 and 604 may be Ethernet-compliant data frames. Data packets/frames 602 and 604 may be interleaved with inter-packet gaps (IPG).

Inter-packet gaps may be employed by a communication system to transmit control or idle characters. An IPG comprises one or more filler, control, or idle characters. For purposes of this description the terms filler, control, and/or idle characters may be used interchangeably. The length or number of filler/control/idle characters and the frequency with which such characters are transmitted and/or interleaved may vary depending on the particular application.

Idle characters are generically denoted as /I/. In one embodiment, the idle characters may include characters /A/ (Align), /K/ (Synchronization), and /R/ (Skip or Removable). In various implementations one or more idle, filler, control characters may be termed deletable or removable characters.

Figure 7:
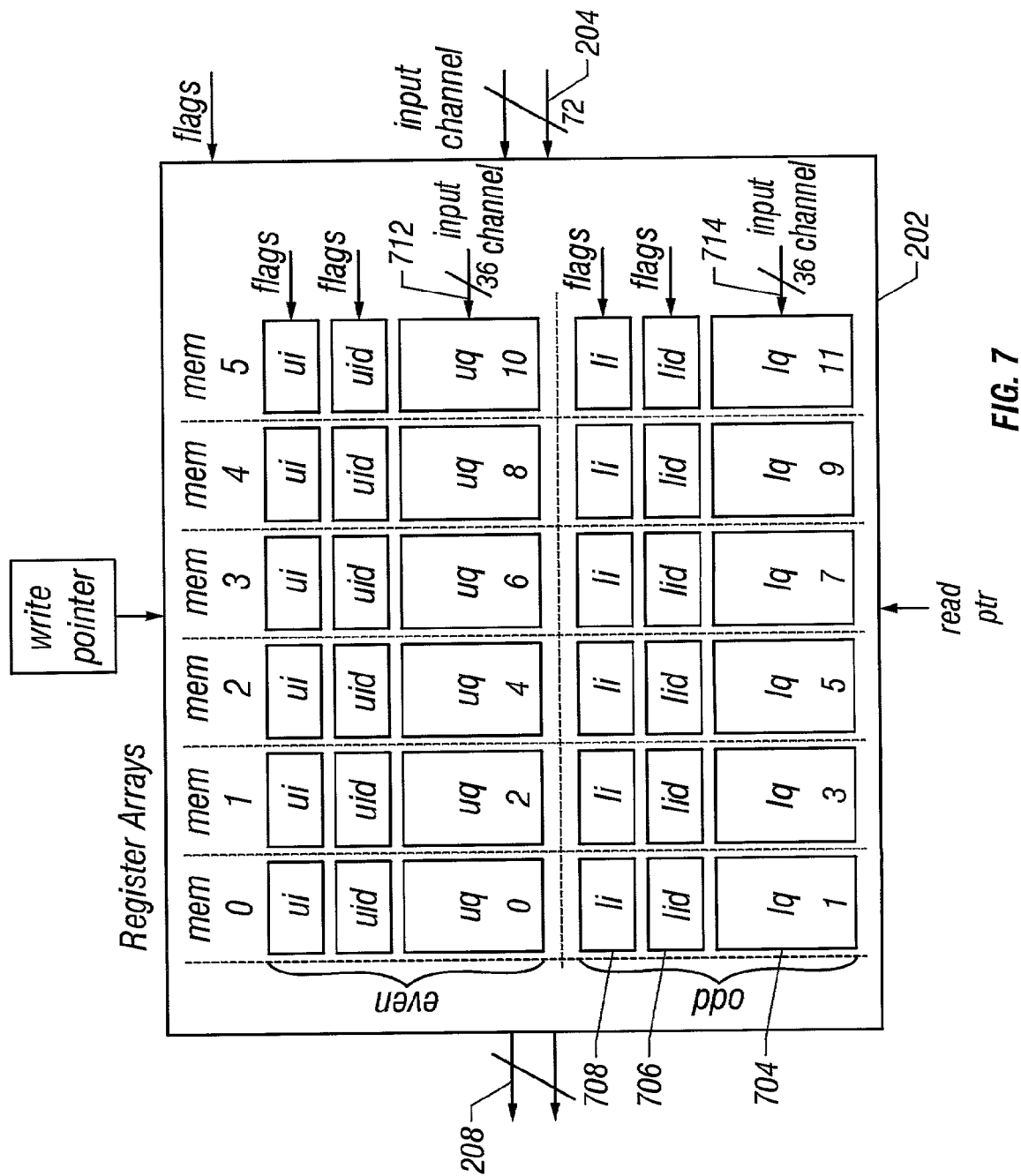
FIG. 7 is a block diagram illustrating one embodiment of a data storage buffer as may be employed in one embodiment of the rate matching invention.

FIG. 7 is a block diagram illustrating one embodiment of a data storage buffer 202 as may be employed in one embodiment of the rate matching invention. The data buffer 202 may be configured as one or more storage elements (e.g. queue 704), each storage element to store a set of one or more characters or data sets received over the input channel 204. The storage element may be a storage register and/or queue element.

The storage elements may be logically or physically divided into an upper memory bank and a lower memory bank. Storage elements/queues (uq) in the upper memory bank may also be termed "even" storage elements/queues and are denoted by uq0, uq2, uq4, uq6, uq8, and uq10. The lower memory bank storage elements/queues (lq) may be termed "odd" storage elements/queues and are denoted by lq1, lq3, lq5, lq7, lq9, and lq11. While queues zero through eleven (0–11) are shown in FIG. 7, this is for illustration purposes only and a buffer 202 with a fewer or greater number of storage elements may be employed in the same or a different configuration without deviating from the invention.

In one embodiment, each storage element/queue (e.g. queue 704) may have one or more associated flag registers, e.g. registers 706 and 708, to store flags corresponding to the stored character(s) in the corresponding queue, e.g. 704. Flag registers, e.g. 706 and 708, may be any physical or logical element(s) capable of storing one or more flags/markers, such as bits, corresponding to some characteristic of the data in the corresponding queues. The flags may be determined by a preprocessor device, such as a flag generator 502, internal or external to the data buffer 202.

According to one embodiment, incoming data is written into the storage elements/queues starting at an upper queue in a first column, e.g. column mem0 uq0, and then into the lower queue for the same column, e.g. column mem0 lq1. This process is repeated with each adjacent column, e.g. columns mem1, mem2, etc. Where the buffer 202 is logically or physically configured as a circular queue, once data is stored in the last column, e.g. column mem5, of the buffer 202, subsequent data is stored in the earliest accessed column, e.g. column mem0.

In one embodiment, the storage elements may be physically or logically divided into columns and paired. For example, as shown in FIG. 6, storage elements uq0 and lq1 are paired in a column labeled mem0. Similarly, storage elements uq2 and lq3, uq4 and lq5, etc., are paired into corresponding columns mem1 and mem2.

In various implementations, the buffer 202 and storage elements uq and lq may be configured such that storage elements uq and lq store one or more bits, characters, or sets of characters. That is, data in the data stream may be stored as one or more sets of one or more bits or one or more characters.

According to one implementation, the buffer 202 may receive and store seventy-two (72) bits of data from the input channel 202 per write cycle. In one embodiment, on every write cycle the input data is stored as two data sets, each data set including one or more characters. For example, the buffer 202 may store half of the incoming data per write cycle in an upper storage element uq and the other half in a lower storage element lq. For instance, in a write cycle when the write pointer is set to mem4 the first half of the data may be stored in storage element uq8 and the second half of the data may be stored in storage element lq9.

In one embodiment, the storage elements may be configured as a circular buffer where incoming data is stored in the earliest accessed storage element. The buffer 202 and storage elements uq and lq may also be configured as a first-in first-out (FIFO) stack.

Data from the queues and flag registers may be read via a read pointer configured to access a particular memory column, e.g. mem2, and sent out an output channel 208. In another embodiment, one or more read pointers may be configured to access one or more memory columns and/or queues and flag registers to read the data and flags from the corresponding storage elements and flag registers.

In one implementation, the data in each storage element/queue uq and lq has an associated idle flag (ui and li) and idle deletable flag (uid and lid). The idle and idle deletable flags may be stored in one or more registers (e.g. 606 and 608).

According to one embodiment, the idle flag (ui or li) is set when the data in the corresponding queue (uq or lq) includes one or more idle characters, or set of characters, forming part of an IPG. The idle deletable flag is set when the data in the corresponding queue (the character or set of characters) includes one or more idle characters, forming part of an IPG, which according to one aspect of the invention may be deleted, removed, and/or skipped by the system to perform rate matching. That is, because they are idle characters they may be removed without affecting the accuracy of the information transmitted.

In one embodiment, an idle deletable flag is set when there are at least two consecutive idle characters, or sets of characters, in the input channel and the second idle character, or set of characters, is deletable. That is, after a first idle character, or set of characters, is detected, the immediately following idle character(s) may be marked as idle deletable. According to one implementation, the second idle character, or sets of characters, is marked as idle deletable if it is a removable/skippable idle character.

Figures 8, 8A:
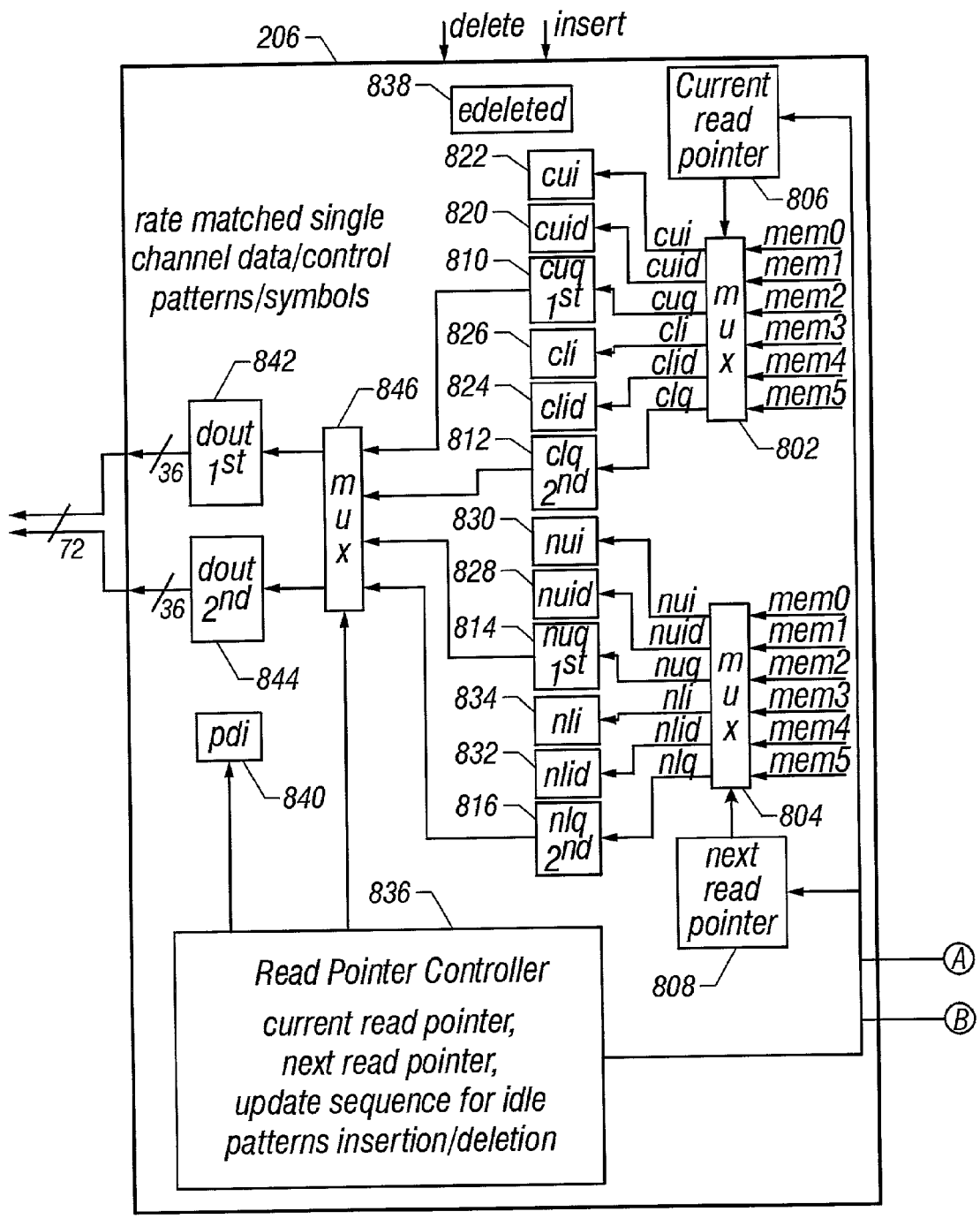
FIG. 8 is a block diagram illustrating one embodiment of the components of the rate matching invention.
Figure 8B:
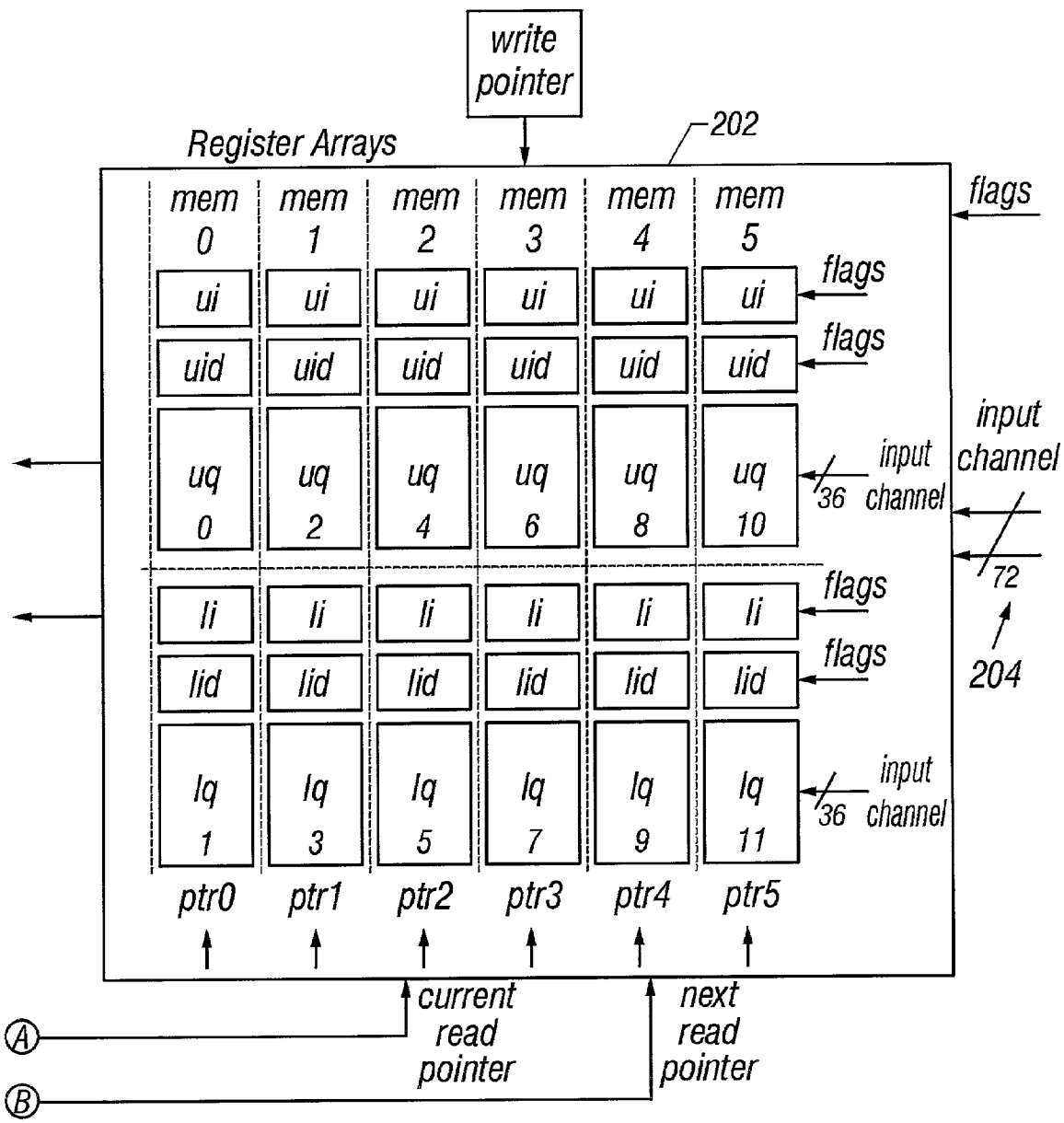

FIG. 8 is a block diagram illustrating one embodiment of the rate matching circuit (channel controller) 206 and data buffer 202. The rate matching circuit 206 may include one or more flow control devices 802 and 804, such as multiplexers, coupled to the storage devices of the data buffer 202 to access and read the stored data. The rate matching circuit 206 further includes data storage queues 810, 812, 814 and 816, registers 820, 822, 824, 826, 828, 830, 832 and 834 to store the flags corresponding to the queues, and a read pointer controller 836 to control the read pointers and operation according to the scheme of the invention. An output stage, including a flow control device 846 and output queues 842 and 844, is coupled to the pointer controller 836 to output the data in the queues 810, 812, 814, and 816. The pointer controller 836 is coupled the flow control devices 802 and 804 and generates one or more read pointers 806 and 808 to control the data read into the queues 810, 812, 814, and 816.

The read pointer controller 836 may also serve the purpose of controlling the operations to implement the rate matching scheme of the invention. When a difference in the rate at which data is written to (write clock) and read from (read clock) the buffer 202 is detected, the rate matching circuit 206 may match the rates so that the buffer 202 does not underflow or overflow.

An underflow condition occurs when data is being read from a buffer faster than it is written to the buffer. This may cause the buffer to eventually be emptied and causing corrupt data or non-data to be read.

An overflow condition occurs when data is written to a buffer faster than it is read from the buffer. This may cause the buffer to eventually become full causing data to be dropped or overwritten. For instance, in a circular buffer, overflow may cause data to be stored over other data which has not yet been read. This would result in corruption of the output data stream.

The data stored in queues 810 and 812 and corresponding flag registers 820, 822, 824 and 826 is the data from the data buffer 202 storage column pointed to by the current read pointer. For example, if the current read pointer points to storage column mem2 in the data buffer 202 then current upper queue cuq 810 contains the data in upper queue uq4 in column mem2, current lower queue clq 812 contains the data in the lower queue lq5, and the corresponding flags for each queue are stored in the corresponding flag registers 820, 822, 824, and 826. Similarly, data stored in next upper and lower queues nuq 814 and nlq 816 and corresponding flag registers 828, 830, 832, and 834 is the data from the data buffer 202 column pointed to by the next read pointer.

Rate or frequency differences between a write clock and a read clock may be compensated by the rate matching circuit 206 by either inserting or deleting one or more idle or filler characters to prevent the data buffer 202 from underflowing or overflowing.

According to one implementation, the one or more filler characters are inserted or deleted from the transmission channel only during an IPG interval. The invention permits the insertion and deletion of idle characters in a data stream according to a novel scheme with minimal steps to reduce delays and allow implementation in an integrated circuit device.

Figure 9:
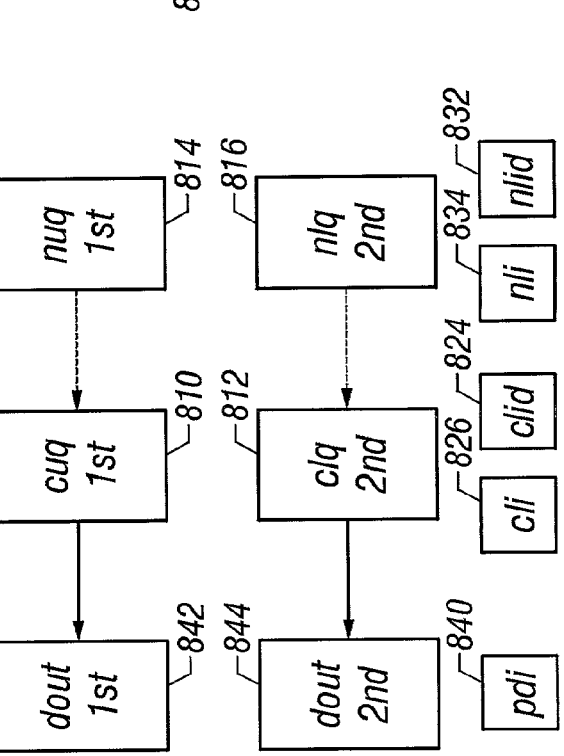
FIG. 9 is a block diagram illustrating a first mode of operation of one embodiment of the rate matching invention.

FIG. 9 is a block diagram illustrating a first mode of operation of one embodiment of the rate matching invention. This figure serves to illustrate how one embodiment of the rate matching circuit 206 may read and process data stored in the data buffer 202 in a first mode of operation. Data in the current queues 810 and 812 and corresponding flags 820, 822, 824, and 826 is the data stored at the data buffer 202 columns pointed to by the current read pointer 806. Data in the next queues 814 and 816 and corresponding flags 828, 830, 832, and 834 is the data stored in the data buffer 202 columns pointed to by the next read pointer 808.

When no rate matching is necessary, e.g. the write and read clocks are matched, no insertion or deletion of idle or filler characters is necessary. Data in the current upper queue cuq 810 is sent directly to the first output queue 842 and data in the lower queue 812 is sent directly to the second output queue 844.

According to one embodiment, incoming data is stored in one or more columns of the data buffer 202 starting at the upper queue uq and then the lower queue lq for each column. To maintain the correct data sequence, data from the first output queue 842 is sent out the output channel before the data in the second output queue 844.

Once the data is sent out from the data buffer 202 column pointed to by the current read pointer 806, the current read pointer 806 is moved/changed to the next column. The next column is the column pointed to by the next read pointer 808. In turn, the next read pointer 808 is also changed to point to the next column from which data is to be read. For example, if incoming data had been stored in data buffer 202 columns mem2, mem3, and mem4 in that order, then, once data from column mem2 is read and processed, the current read pointer 806 is changed from column mem2 to column mem3 and the next read pointer 808 is changed from column mem3 to column mem4.

According to one implementation, the rate matching circuit 206 reads data from the data buffer 202 synchronized by a read clock. In one embodiment, data is read into both the current queues cuq 810 and clq 812 and the next queues nuq 814 and nlq 816 on the same clock cycle.

Figure 10A:
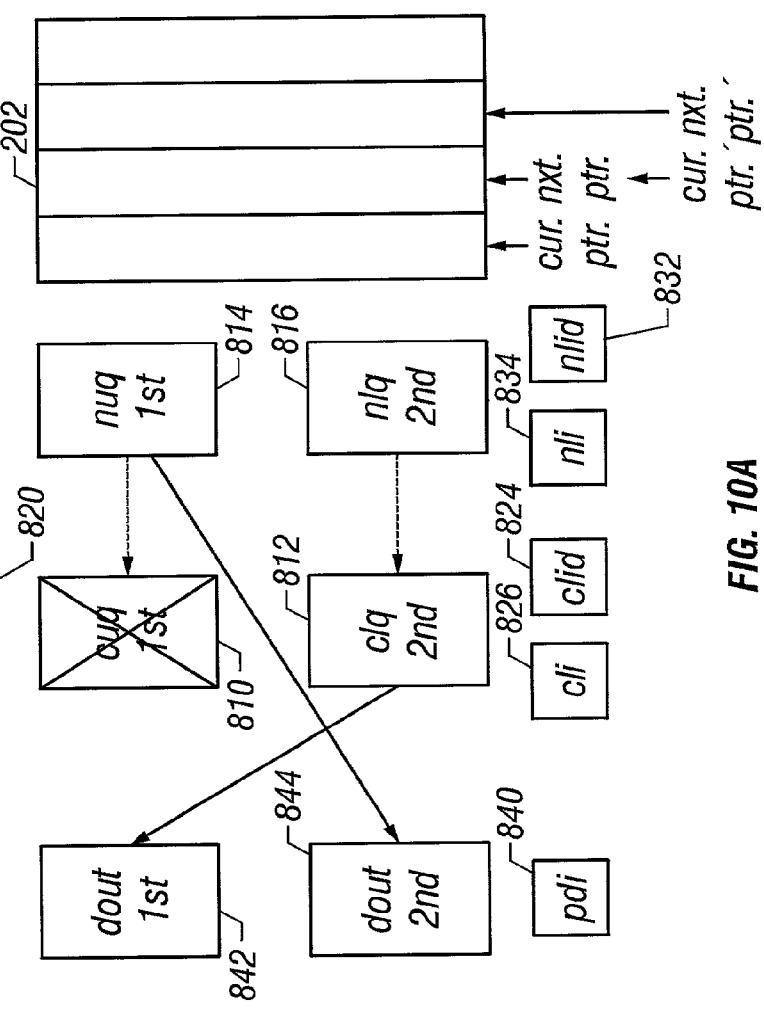
FIG. 10A is a block diagram illustrating another mode of operation of one embodiment of the rate matching invention when an overflow condition is detected.
Figure 10B:
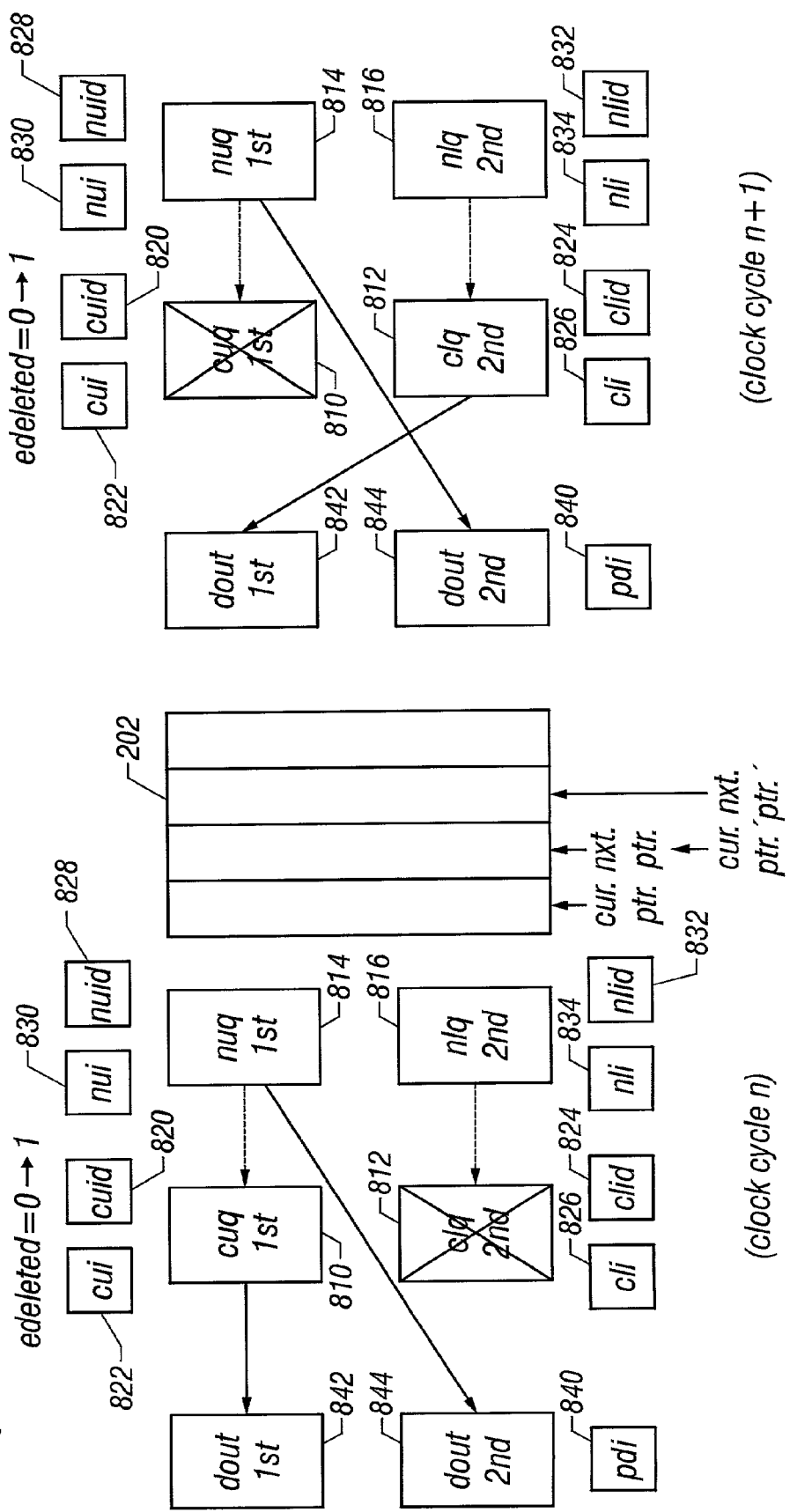
FIG. 10B is a block diagram illustrating yet another mode of operation of one embodiment of the rate matching invention when an overflow condition is detected.

FIGS. 10A–B illustrate how one embodiment of the rate matching system may delete or remove idle data/characters from the data stream to match the rates of the read and write clocks when an overflow condition is detected.

FIG. 10A is a block diagram illustrating another mode of operation of one embodiment of the rate matching invention when an overflow condition is detected. This figure shows how the rate matching circuit 206 processes various queues when an overflow condition has been detected and the data in the current upper queue cuq 810 has been determined to be deletable.

According to one implementation, data is deletable if it is a removable idle character within an IPG which is preceded by at least one removable idle character. The data monitor/flag generator 502 may serve to identify which data buffer storage elements/queues contain data which is idle and deletable. This information may be marked in the corresponding flag registers. A first flag, li and ui, identifies idle characters. A second flag, lid and uid, identifies idle deletable characters. These flags are read and accessed by the rate matching circuit 206 when the corresponding storage elements/queues are accessed.

According to one embodiment, the rate matching circuit 206 seeks to identify deletable data based on the idle deletable flags 820, 824, 828, and 832. The circuit 206 may seek the first deletable flag based on the order in which the data is to be placed on the output channel. For example, in one implementation, the circuit 206 may first seek the current upper idle deletable flag cuid 820, then the current lower idle deletable flag lid 824, then the next upper idle deletable flag nuid 828, and lastly the next lower idle deletable flag 832.

Referring to FIG. 10A, data in the current upper queue cuq 810 is marked as idle deletable cuid by the flag 820. The rate matching circuit 206 may delete the data in the current upper queue cuq 810 by skipping the data in the queue 810 to match the rates between the read and write clocks. That is, the data in the queue 810 is not processed or transmitted by the rate matching circuit 206, rather it is merely dropped.

In order to maintain the data stream in the correct sequence, data from the current lower queue clq 812 must be sent to the first output queue 842. This is because in this implementation, incoming data is stored in the upper queue uq and then the lower queue lq, in that order, for each memory column. The next data in the data stream is stored in the next upper queue nuq 814 which is sent to the second output queue 844.

In order to keep track of which queue has been skipped, removed, or deleted, the rate matching circuit 206 maintains the even deleted register edeleted 838. When an even/upper queue is skipped, the edeleted flag is set (1).

The current and next read pointers (cur ptr & nxt ptr) are advanced. The new current read pointer (cur ptr') and new next read pointer (nxt prt') point to the next memory columns in the sequence. The data in these columns is read into the current queues cuq 810 and clq 812 and next queues nuq 814 and nlq 816 respectively.

On the next clock cycle, the same process is repeated. The new data from the current lower queue clq 812 is again sent to the first output queue 842 and the new data in the next upper queue nuq 814 which is sent to the second output queue 844. For example, if on a first clock cycle data in uq4 had been skipped data in lq5 and uq6 had been transmitted, then on the next clock cycle lq6 and uq7 would be transmitted in that order. This process is continued for all subsequent data in the data buffer 202 until the rate matching conditions change.

FIG. 10B is a block diagram illustrating yet another mode of operation of one embodiment of the rate matching invention when an overflow condition is detected. This figure illustrates the scenario where an overflow condition is detected (i.e. the write clock is faster than the read clock) and the data in the current lower queue clq 812 has been marked as idle deletable lid 824. The rate matching circuit

206 may delete the data in the current lower queue clq 812 by skipping the data in the queue 812 to match the rates between the read and write clocks. That is, the data in the queue clq 812 is not processed or transmitted by the rate matching circuit 206, rather it is merely dropped.

In order to maintain the data stream in the correct sequence, at clock cycle n data from the current upper queue cuq 810 must be sent to the first output queue 842. The current lower queue clq 812 is skipped to match the read and write clock rates. The next data in the data stream is stored in the next upper queue nuq 814 which is sent to the second output queue 844.

The current and next read pointers (cur ptr & nxt ptr) are advanced. The new current read pointer (cur ptr') and new next read pointer (nxt prt') point to the next memory columns in the sequence. The data in these columns is read into the current queues cuq 810 and clq 812 and next queues nuq 814 and nlq 816.

On the next clock cycle (clock cycle n+1), the data in the current upper queue cuq 810 is marked as idle deletable cuid 820 and is skipped. This data has already been transmitted through the output channel in the previous clock cycle (clock cycle n) when it was stored in the next upper queue nuq 814. The even deleted (edeleted) flag 838 is set (1) to indicate that the current upper queue cuq 810 has been skipped/deleted. The process illustrated in FIG. 10A is then implemented. The data in the current lower queue clq 812 is sent to the first output queue 842 and the data in the next upper queue nuq 814 which is sent to the second output queue 844. The process illustrated in FIG. 10A continues to be implemented for all subsequent data in the data buffer 202 until the rate matching conditions change.

Figure 11A:
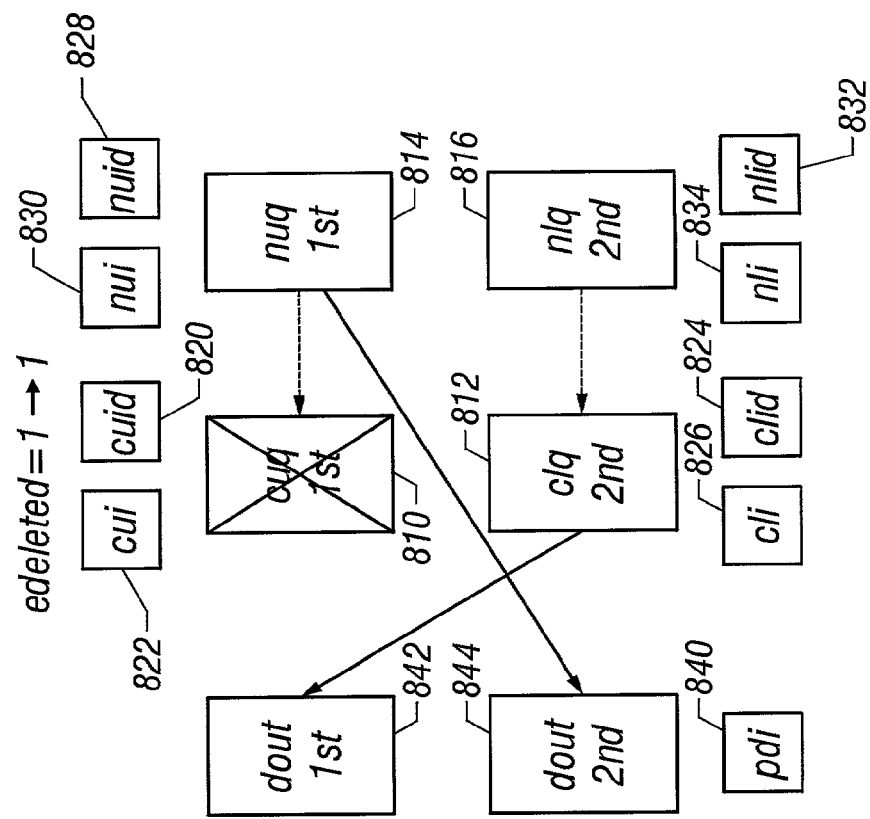
FIG. 11A is a block diagram illustrating a mode of operation of one embodiment of the rate matching invention when an overflow condition has been previously detected.
Figure 11B:
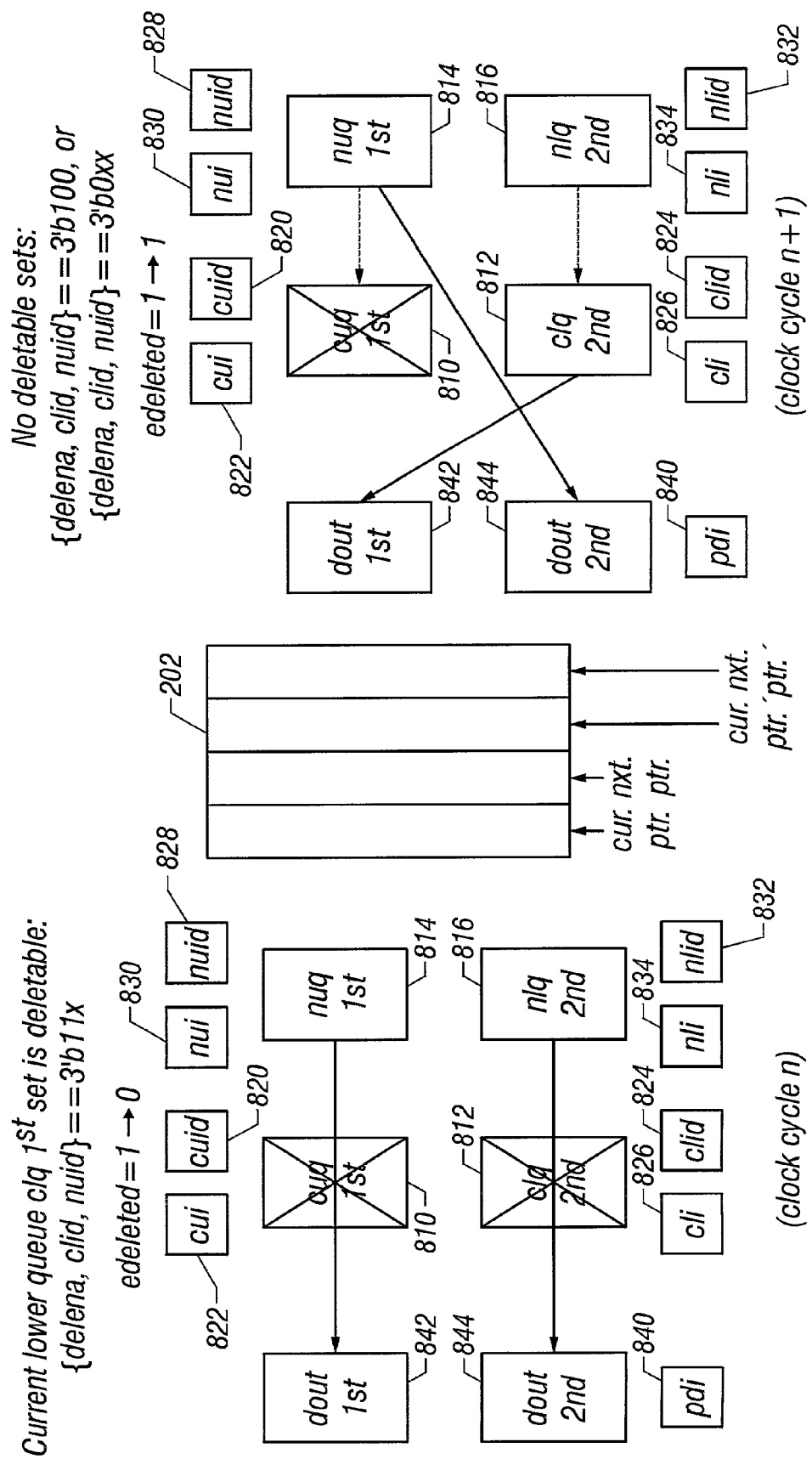
FIG. 11B is a block diagram illustrating a mode of operation of one embodiment of the rate matching invention when a second overflow condition is detected.
Figure 11C:
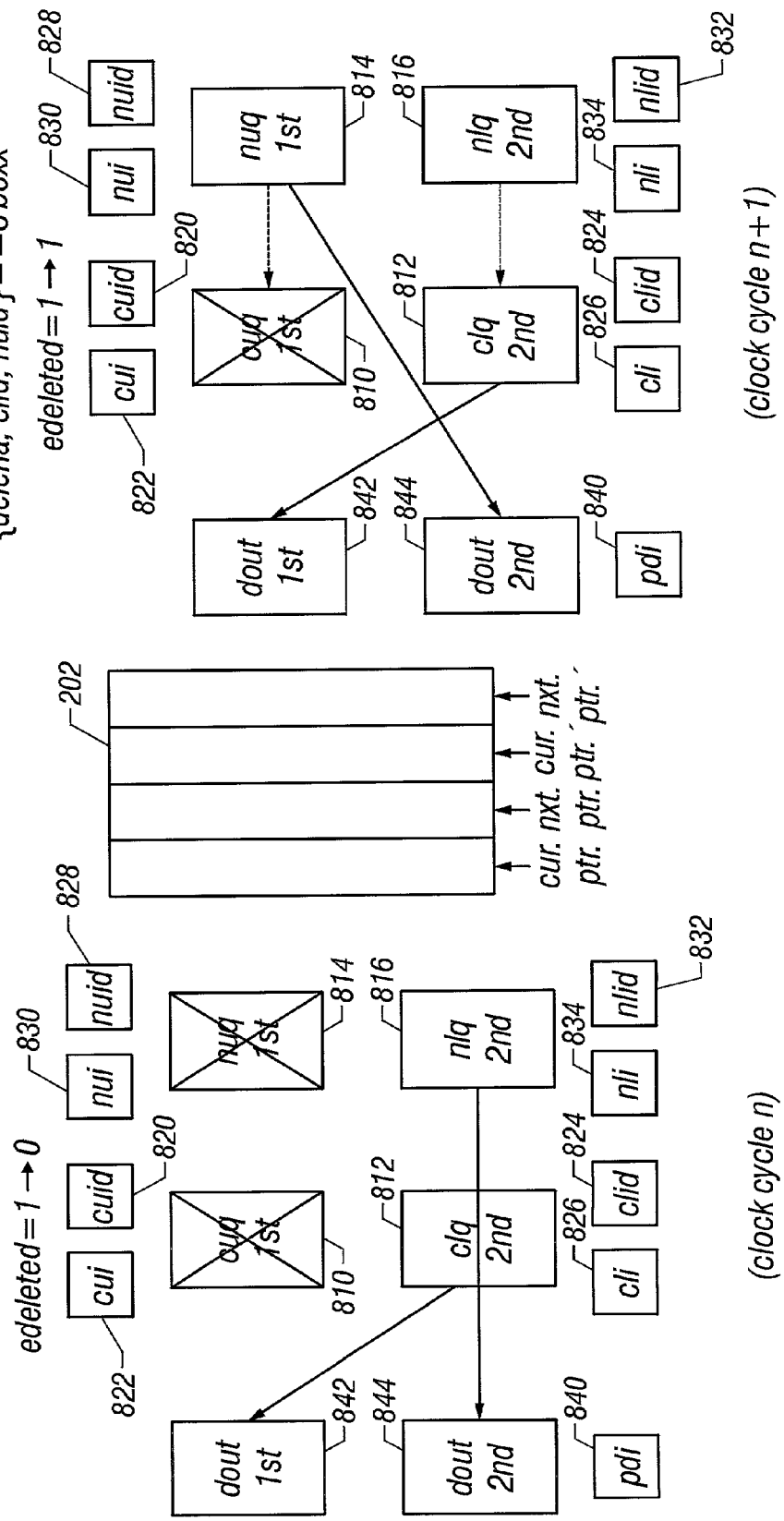
FIG. 11C is a block diagram illustrating yet another mode of operation of one embodiment of the rate matching invention when a second overflow condition is detected.

FIGS. 11A–C illustrate how one embodiment of the rate matching invention may delete, remove, or skip idle data from the data stream to match the rates of the read and write clocks where on overflow condition is detected. These figures illustrate the condition where the even deleted edeleted flag 838 has already been set (1). This means that idle characters were previously deleted from the data stream.

FIG. 11A is a block diagram illustrating the mode of operation of one embodiment of the rate matching invention where an overflow condition has been previously detected. For instance, FIG. 11A may illustrate the operation of the rate matching circuit 206 when idle characters were deleted in a prior operation. FIG. 11A may represent the operating status of the rate matching circuit 206 after removal of data as illustrated in FIGS. 10A and/or 10B. Where a rate mismatch is detected but no deletable data/queues are available, the circuit 206 continues to operate in the same way until deletable data comes across the data stream and is stored in the buffer 202.

FIG. 11B is a block diagram illustrating the mode of operation of one embodiment of the rate matching invention where a second overflow condition is detected. This figure illustrates the operation of the rate matching circuit 206 where an overflow condition is detected, and the even deleted edeleted flag 838 has been previously set (1). Thus, at clock cycle n−1 the rate matching circuit 206 is operating as illustrated in FIG. 11A when the overflow condition is detected. At clock cycle n, where the idle deletable flag 824 indicates that the data in the current lower queue clq 812 is deletable, the rate matching circuit 206 deletes the data in the current lower queue clq 812 by skipping the data in the queue 812 to match the rates between the read and write clocks. That is, the data in the queue 812 is not processed or transmitted by the rate matching circuit 206, rather it is merely dropped.

At clock cycle n, in order to maintain the data stream in the correct sequence, data from the next upper queue nuq 814 must be sent to the first output queue 842 while data from the next lower queue nlq 816 is sent to the second output queue 844.

The current and next read pointers (cur ptr & nxt ptr) are advanced twice (illustrated in 202 FIG. 11B). That is, the new current pointer (cur ptr') does not point to the location of the previous next current pointer (nxt ptr) but rather to the next memory location/columns storing the next sequential data in the data stream. Similarly, the next read pointer nxt ptr' is advanced to the memory location/column holding data which follows the data pointed to by the current read pointer cur ptr'. On the next clock cycle the data in these columns is read into the current queues cuq 810 and clq 812 and next queues nuq 814 and nlq 816.

The even deleted register 838 is reset so that the edeleted flag is cleared (0).

On the next clock cycle (clock cycle n+1), the data in the current upper queue cuq 810 is sent directly to the first output queue 842 and the data in the current lower queue clq 812 is sent directly to the second output queue 844 to be sent out the output channel 210. This process continues as illustrated in FIG. 9 until the rate matching conditions change.

FIG. 11C is a block diagram illustrating yet another mode of operation of one embodiment of the rate matching invention where a second overflow condition is detected. This figure illustrates the scenario where an overflow condition is detected (i.e. the write clock is faster than the read clock) and the even deleted (edeleted) flag 838 has been previously set (1). Thus, at the time the overflow condition is detected the rate matching circuit 206 is operating as illustrated in FIG. 11A. At clock cycle n, the rate matching system seeks the first available deletable data queues 812, 814, or 816 based on their corresponding deletable flags 824, 828, and 832. If the current lower queue clq 812 is not deletable, then the circuit 206 checks the next upper queue nuq 814. In the illustration in FIG. 11C, the next upper queue nuq 814 is deletable, e.g. the next upper deletable flag 828 is set, and the rate matching circuit 206 proceeds to skip this queue 814. That is, the data in the queue 814 is not processed or transmitted by the rate matching circuit 206, rather it is merely dropped.

In order to maintain the data stream in the correct sequence, data from the current lower queue clq 812 must be sent to the first output queue 842. As noted above, deletable data in the next upper queue nuq 814 is skipped to match the read and write clock rates. Data in the next lower queue nlq 816 is sent to the second output queue 844.

The current and next read pointers (cur ptr & nxt ptr) are advanced (illustrated in 202 FIG. 11C). The new current pointer (cur ptr') does not point to the location of the previous next current pointer (nxt ptr) but rather to the next memory location/columns storing the next sequential data in the data stream. Similarly, the next read pointer (nxt ptr') is advance to the memory location/column holding data which follows the data pointed to by the current read pointer (cur ptr'). The data in these columns is read into the current queues 810 and 812 and next queues 814 and 816.

The even deleted register 834 is reset so that the edeleted flag is cleared (0).

On the next clock cycle (clock cycle n+1), the data in the current upper queue cuq 810 is sent directly to the first output queue 842 and the data in the current lower queue clq 812 is sent directly to the second output queue 844 to be sent out the output channel. This process continues as illustrated in FIG. 9 until the rate matching conditions change.

By implementing the character deletion methods illustrated in FIGS. 10A–B and 11A–C all possible scenarios of overflow conditions are addressed in an efficient and systematic manner.

Figures 12A, 12B:
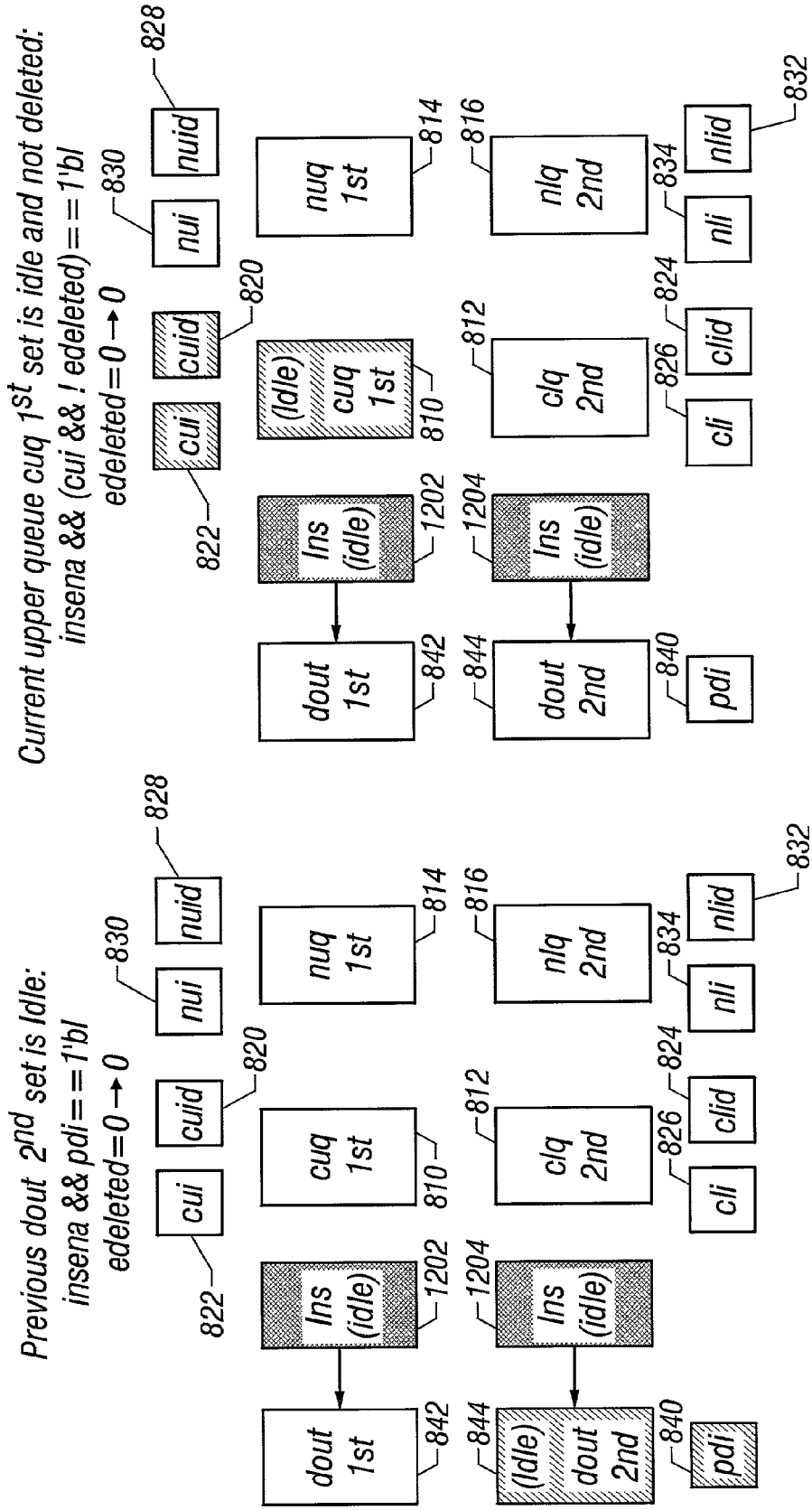
FIG. 12A is a block diagram illustrating a mode of operation of one embodiment of the rate matching invention when an underflow condition is detected.
FIG. 12B is a block diagram illustrating yet another mode of operation of one embodiment of the rate matching invention when an underflow condition is detected.
Figure 12C:
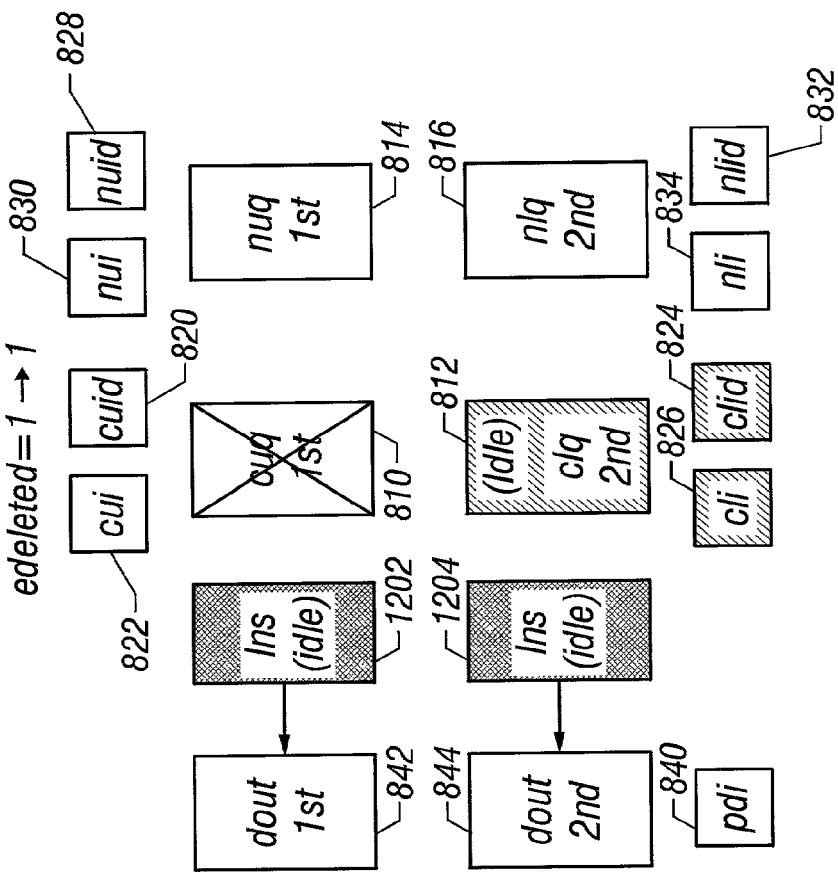
FIG. 12C is a block diagram illustrating yet another mode of operation of one embodiment of the rate matching invention when an underflow condition is detected.

FIGS. 12A–C illustrate how one embodiment of the rate matching system may insert idle data into the data stream to match the rates of the read and write clocks when an underflow condition is detected, i.e. the read clock is faster than the write clock. According to one embodiment, idle data is inserted into the data stream at a location either following or preceding other idle data in the stream.

FIG. 12A is a block diagram illustrating the mode of operation of one embodiment of the rate matching invention when an underflow condition is detected. This figure illustrates the condition where the preceding data in the second output queue 844 was idle data. This is noted by a previous lower queue idle register pdi 840 which keeps track of this flag for all outgoing data over the second output queue 844. Idle data may be inserted 1202 and 1204 by the rate matching circuit 206 on the next clock cycle directly into the first output queue 842 and the second output queue 844. Neither the current read pointer nor the next read pointer change or advance on the clock cycle when insertion is taking place. This permits the read clock to match the rate of the write clock.

After the inserted characters are transmitted over the output channel, data in the current queues 810 and 812 and next queues 814 and 816 are processed as usual.

FIG. 12B is a block diagram illustrating yet another mode of operation of one embodiment of the rate matching invention when an underflow condition is detected. This figure illustrates the scenario where data in the current upper queue 810 is idle and the even deleted flag 838 is not set. Idle data may be inserted 1202 and 1204 by the rate matching circuit 206 on the next clock cycle directly into the first output queue 842 and the second output queue 844. Neither the current read pointer nor the next read pointer are changed or advanced on the clock cycle when insertion is taking place. This permits the read clock to match the rate of the write clock.

After the inserted characters are transmitted over the output channel 210, data in the current queues 810 and 812 and next queues 814 and 816 are processed in subsequent clock cycles as it had been prior to the insertion of the idle characters.

FIG. 12C is a block diagram illustrating yet another mode of operation of one embodiment of the rate matching invention when an underflow condition is detected. This figure illustrates the scenario where data in the current lower queue cuq 812 is idle and the even deleted edeleted 838 flag is set (1)(thus skipping cuq 810). Idle data may be inserted 1202 and 1204 by the rate matching circuit 206 on the next clock cycle directly into the first output queue 842 and the second output queue 844. Neither the current read pointer nor the next read pointer are changed or advanced on the clock cycle when insertion is taking place. This permits the read clock to match the rate of the write clock.

Because a buffer 202 has limited size, the rate matching circuit 206 may only be able to compensate up to a maximum frequency difference between a write clock and a read clock. That is, if the frequency difference between the read and write clocks is too great, the rate matching scheme may not be able to match the rates quickly enough to prevent an underflow or overflow of the buffer 202. The size of the buffer 202, the frequency with which IPG are inserted in the data stream, and the frequency with which deletable idle characters are found within the IPG may all dictate the maximum frequency difference between two clocks which the rate matching scheme may successfully overcome. In one implementation, this maximum frequency difference may be specified as plus or minus one cycle per one thousand cycles. The rate matching system may compensate for larger frequency differences by increasing the size of the buffer 202, increasing the number of deletable characters in an IPG, and/or increasing the frequency of the IPGs.

The size of the buffer 202 may vary according to the particular implementation. Generally, a buffer 202 may include sufficient storage locations to accommodate for synchronization latencies, overflow, and underflow. According to one embodiment, a buffer 202 may comprise a FIFO buffer stack, such as FIFO buffer stack, with one or more storage locations, each at least half as wide as the total sum of the input channel data bits. In one embodiment, the rate matching buffer 202 comprises a FIFO buffer stack twelve storage elements deep, each element thirty-six bits wide. However, this aspect of the invention may be extended to function with larger or smaller buffers and additional counters.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Additionally, it is possible to implement the invention or some of its features in hardware, programmable devices, firmware, integrated circuits, one or more machine-readable instructions, software or a combination thereof. One or more aspects of the invention may be embodied in a processor-readable storage medium or machine-readable medium such as a magnetic, optical, or semiconductor storage medium.

What is claimed is:

1. An apparatus comprising:
    a buffer to receive a data stream, wherein data is written to the buffer according to a first clock, the buffer configured as a first-in first-out stack;
    a character monitor coupled to the buffer to monitor the occurrence of an inter-packet gap in the data stream containing removable filler characters and identify the removable filler characters in the buffer; and
    a channel controller configured to read data from the buffer according to a second clock and transmit it over an output channel, the channel controller to skip the transmission of one or more removable filler characters if the first clock is faster than the second clock to match the first and second clock rates, the channel controller including a read pointer controller, the read pointer controller to access a first, a second, a third, and a fourth data sets stored in the buffer, the first, second, third, and fourth data sets forming contiguous parts of the data stream in that order with the first data set being first in the data stream and the fourth data set being last in the data stream, wherein in a first mode of operation the channel controller transmits the first and second data sets over the output channel.

2. The apparatus of claim 1 wherein a buffer overflow condition exists if the first clock writes data to the buffer faster than the second clock reads data from the buffer.

3. The apparatus of claim 1 wherein if an overflow condition is detected the channel controller seeks a data set marked as removable within an inter-packet gap.

4. The apparatus of claim 1 wherein if an overflow condition is detected and the first data set is marked as removable, then the channel controller skips transmission of the first data set and transmits the second data set and the third data set in the next second clock cycle.

5. The apparatus of claim 1 wherein if an overflow condition is detected and the second data set is marked as removable, then the channel controller skips transmission of the second data set and transmits the first data set and the third data set in the next second clock cycle.

6. The apparatus of claim 1 wherein if an overflow condition is detected and a first data set was previously skipped and the second data set is marked as removable, then on the next clock cycle the channel controller skips transmission of the second data set and transmits the third data set and the fourth data set.

7. The apparatus of claim 1 wherein if an overflow condition is detected and a first data set was previously skipped and a third data set is marked as removable, then on die next clock cycle the channel controller skips transmission of the third data set and transmits the second data set and the fourth data set.

8. The apparatus of claim 1 wherein the apparatus is an integrated circuit.

9. The apparatus of claim 1 wherein the first and second clocks have a maximum rate difference of one cycle per one thousand cycles.

10. A method for matching the transmission rates of a first clock to the transmission rates of a second clock comprising:
receiving sets of one or more characters over an input channel synchronized by the first clock;
buffering the sets of characters received;
transmitting the buffered sets of characters over an output channel synchronized by the second clock;
skipping transmission of a set of characters marked as removable within an inter-packet gap if an overflow condition is detected;
reading a first, a second, a third, and a fourth data sets, wherein the first, second, third, and fourth data sets are contiguous data segments in that order;
transmitting the first and second data sets on a first cycle of the second clock; and
transmitting the third and fourth data sets on a second cycle of the second clock.

11. The method of claim 10 wherein the sets of one or more characters are received and buffered per first clock cycle.

12. The method of claim 10 wherein two sets of one or more characters are transmitted per second clock cycle.

13. The method of claim 10 wherein a set of one or more characters is marked as removable if it contains one or more filler characters and follows a set of one or more filler characters in the input channel.

14. The method of claim 10 wherein an overflow condition is detected if the first clock is faster than the second clock.

15. The method of claim 10 wherein if an overflow condition is detected and the first data set is marked as removable, then skipping the transmission of the first data set and transmitting the second data set and the third data set in the next second clock cycle.

16. The method of claim 10 wherein if an overflow condition is detected and the second data set is marked as removable, then skipping the transmission of the second data set, and transmitting the first data set and the third data set in the next second clock cycle.

17. The method of claim 10 wherein if an overflow condition is detected and a first data set was previously skipped and the second data set is marked as removable, then on the next second clock cycle skipping the transmission of the second data set, and transmitting the third data set and the fourth data set.

18. The method of claim 10 wherein if an overflow condition is detected and a first data set was previously skipped and the third data set is marked as removable, then on the next second clock cycle skipping the transmission of the third data set, and transmitting the second data set and the fourth data set.

19. A rate matching system comprising:
means for receiving an input data stream of one or more character sets over an input channel synchronized by a first clock;
means for buffering the one or more sets of characters;
means for transmitting the buffered data over an output channel as an output data stream synchronized by a second clock;
means for removing one or more sets of filler characters from the output data stream if an overflow condition is detected;
means for accessing a first, a second, a third, and a fourth character sets, wherein the first, second, third, and fourth character sets are contiguous data segments of the input data stream in that order; and
means for transmitting the first and second character sets on a first cycle of the second clock.

20. The rate matching system of claim 19 further comprising:
means for detecting an inter-packet gap within the input data stream.

21. The rate matching system of claim 19 further comprising:
means for identifying a set of filler characters within are inter-packet gap as deletable characters.

22. The rate matching system of claim 19 wherein the means for removing one or more sets of filler characters from the output data stream includes means for skipping transmission of a set of characters marked as deletable within an inter-packet gap if the first clock is faster than the second clock.

23. The rate matching system of claim 22 wherein a set of one or more characters is marked as deletable if it contains one or more filler characters and follows a set of one or more filler characters in the input channel.

24. The rate matching system of claim 19 wherein two sets of one or more characters are transmitted per second clock cycle.

25. The rate matching system of claim 19 further comprising:
means for detecting rate differences between the first clock and the second clock.

26. The rate matching system of claim 19 further comprising:
means for transmitting the third and fourth character sets on a second cycle of the second clock.

27. The rate matching system of claim 19 wherein an overflow condition occurs when the first clock is faster than the second clock.

28. The rate matching system of claim 27 further comprising:
means for skipping the transmission of the first character set and transmitting the second character set and the third character set on the first cycle of the second clock if an overflow condition is detected and the first character set is marked as deletable.

29. The rate matching system of claim 27 further comprising:
   means for skipping the transmission of the second character set and transmitting the first character set and the third character set on the first cycle of the second clock if an overflow condition is detected and the second character set is marked as deletable.

30. The rate matching system of claim 27 further comprising:
   means for skipping the transmission of the second character set, and transmitting the third character set and the fourth character set on the first cycle of the second clock if an overflow condition is detected and a previous first data set was skipped and the second data set is marked as deletable.

31. The rate matching system of claim 27 further comprising:
   means for skipping the transmission of the third character set, and transmitting the second character set and the fourth character set on the first cycle of the second clock if an overflow condition is detected and a previous first character set was skipped and the third character set is marked as deletable.

32. A machine-readable medium having one or more instructions for matching transmission rates across a single channel which when executed by a processor causes the processor to:
   receive data over an input channel synchronized by a first clock;
   buffer the data;
   transmit the buffered data over an output channel synchronized by a second clock;
   skip transmission of a data marked as deletable within an inter-packet gap if an overflow condition is detected;
   read a first, a second, a third, and a fourth data sets, wherein the first, second, third, and fourth data sets are contiguous data segments in that order; and
   transmit the first and second data sets on a first cycle of the second clock.

33. The machine-readable medium of claim 32 wherein two sets of data of one or more characters are received and buffered per first clock cycle.

34. The machine-readable medium of claim 32 wherein a data set of one or more characters is marked as deletable if it contains one or more idle characters and follows a data set of one or more idle characters in the input channel.

35. The machine-readable medium of claim 32 wherein the one or more idle characters are removable characters.

36. The machine-readable medium of claim 32 further comprising one or more instructions which when executed by a processor causes the processor to:
   skip transmission of the first data set and transmit the second data set and the third data set in the first cycle of the second clock if an overflow condition is detected and the first data set is marked as deletable.

37. The machine-readable medium of claim 32 further comprising one or more instructions which when executed by a processor causes the processor to:
   skip transmission of the second data set and transmit the first data set and the third data set in the first cycle of the second clock if an overflow condition is detected and the second data set is marked as deletable.

38. The machine-readable medium of claim 32 further comprising one or more instructions which when executed by a processor causes the processor to:
   skip transmission of the second data set and transmit the third data set and the fourth data set on the first cycle of second clock if an overflow condition is detected and a previous first data set was skipped and the second data set is marked as deletable.

39. The machine-readable medium of claim 32 further comprising one or more instructions which when executed by a processor causes the processor to:
   skip transmission of the third data set and transmit the second data set and the fourth data set on the first cycle of the second clock cycle if an overflow condition is detected and a previous first data set was skipped and the third data set is marked as deletable.

* * * * *